United States Patent
Way (10) Patent No.: US 11,115,796 B2
(45) Date of Patent: *Sep. 7, 2021

(54) METHOD AND SYSTEM FOR AN INTEGRATED PUBLIC SAFETY SOLUTION

(71) Applicant: NORCOM, Bellevue, WA (US)

(72) Inventor: Nathan Way, Lynnwood, WA (US)

(73) Assignee: NORCOM, Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/261,432

(22) Filed: Jan. 29, 2019

(65) Prior Publication Data
US 2019/0159010 A1  May 23, 2019

Related U.S. Application Data

(63) Continuation of application No. 14/546,889, filed on Nov. 18, 2014, now Pat. No. 10,194,302, which is a continuation of application No. 14/213,995, filed on Mar. 14, 2014, now Pat. No. 10,194,301.

(60) Provisional application No. 61/905,701, filed on Nov. 18, 2013, provisional application No. 61/792,517, filed on Mar. 15, 2013.

(51) Int. Cl.
*H04W 4/90* (2018.01)
*G06T 11/60* (2006.01)
*H04W 4/029* (2018.01)

(52) U.S. Cl.
CPC .............. *H04W 4/90* (2018.02); *G06T 11/60* (2013.01); *H04W 4/029* (2018.02)

(58) Field of Classification Search
CPC ....... H04W 4/90; H04W 4/029; H04W 4/028; H04W 4/22; G06T 11/60
USPC .................. 455/404.2, 402.2, 401.1
See application file for complete search history.

(56) References Cited

U.S. PATENT DOCUMENTS

| | | | | |
|---|---|---|---|---|
| 7,633,387 | B2 * | 12/2009 | Carmichael | A62C 99/00 340/539.13 |
| 8,005,937 | B2 | 8/2011 | Wesley, Sr. et al. | |
| 8,612,131 | B2 * | 12/2013 | Gutierrez | G01C 21/3691 701/301 |
| 8,825,795 | B2 | 9/2014 | Wesley, Sr. et al. | |
| 8,976,939 | B1 | 3/2015 | Hamilton et al. | |
| 9,167,379 | B1 | 10/2015 | Hamilton et al. | |
| 9,301,117 | B2 | 3/2016 | Leggett et al. | |
| 9,420,116 | B1 | 8/2016 | Hamilton et al. | |
| 9,465,839 | B2 | 10/2016 | Wesley et al. | |

(Continued)

*Primary Examiner* — Farid Seyedvosoghi
(74) *Attorney, Agent, or Firm* — P G Scott Born; Foster Garvey PC (57) ABSTRACT

A method of tracking at least one emergency service provider is disclosed. An electronic history is compiled that includes at least one identifier of a service provider, at least one identifier of an event to which the service provider responded, and GPS data identifying the geographic location of the service provider at each time interval within the duration of the event. A user interface within which is displayed a first identifier of a first event is generated to a display device. A selection of the event identifier is received from a user. In response to the selection of the identifier, an aerial view of a geographic region within which the first event took place is generated. At least one icon is displayed in the aerial view representing the service provider at the geographic location corresponding to at least one time interval during the event.

12 Claims, 10 Drawing Sheets

(56) References Cited

U.S. PATENT DOCUMENTS

| | | | |
|---|---|---|---|
| 9,629,185 B1 | 4/2017 | Gluckman et al. | |
| 2003/0055934 A1* | 3/2003 | Lincke | H04L 29/06 709/223 |
| 2004/0066329 A1* | 4/2004 | Zeitfuss | G01S 5/0018 342/357.31 |
| 2005/0192746 A1 | 9/2005 | King et al. | |
| 2007/0226314 A1* | 9/2007 | Eick | G06T 11/00 709/217 |
| 2009/0054029 A1* | 2/2009 | Hogberg | H04L 41/5006 455/404.2 |
| 2012/0313792 A1* | 12/2012 | Behm | G08G 1/0965 340/902 |
| 2013/0304488 A1* | 11/2013 | Girao | G16H 40/20 705/2 |

\* cited by examiner

METHOD AND SYSTEM FOR AN INTEGRATED PUBLIC SAFETY SOLUTION

CROSS-REFERENCE TO RELATED APPLICATIONS

The present application is a continuation of U.S. application Ser. No. 14/546,889 filed Nov. 18, 2014; which is a continuation of U.S. application Ser. No. 14/213,995 filed Mar. 14, 2014; which claims priority to U.S. Provisional Application No. 61/905,701 filed Nov. 18, 2013; and to U.S. Provisional Application Ser. No. 61/792,517 filed Mar. 15, 2013. All of the aforementioned applications, including any appendices thereto, are hereby incorporated by reference in their entireties as if fully set forth herein.

FIELD OF THE INVENTION

This invention relates generally to the field of emergency communications, and more specifically, to an integrated public safety solution.

BACKGROUND OF THE INVENTION

Coordination among different first-responder agencies, such as police, ambulance and fire, within a community and among agencies in different communities is critical to the well-being of such community(ies). Consequently, a system and/or method that allows visual tracking, in real-time or as near to real-time as is technologically possible, of the location, velocity and bearing of emergency vehicles would be beneficial. Moreover, a system and/or method that allows a comprehensive visual review of coordination efforts after an emergency event of emergency vehicles responding to such event would be likewise beneficial.

BRIEF DESCRIPTION OF THE DRAWINGS

Preferred and alternative examples of the present invention are described in detail below with reference to the following drawing figures.

DETAILED DESCRIPTION

This patent application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

Figure 1:
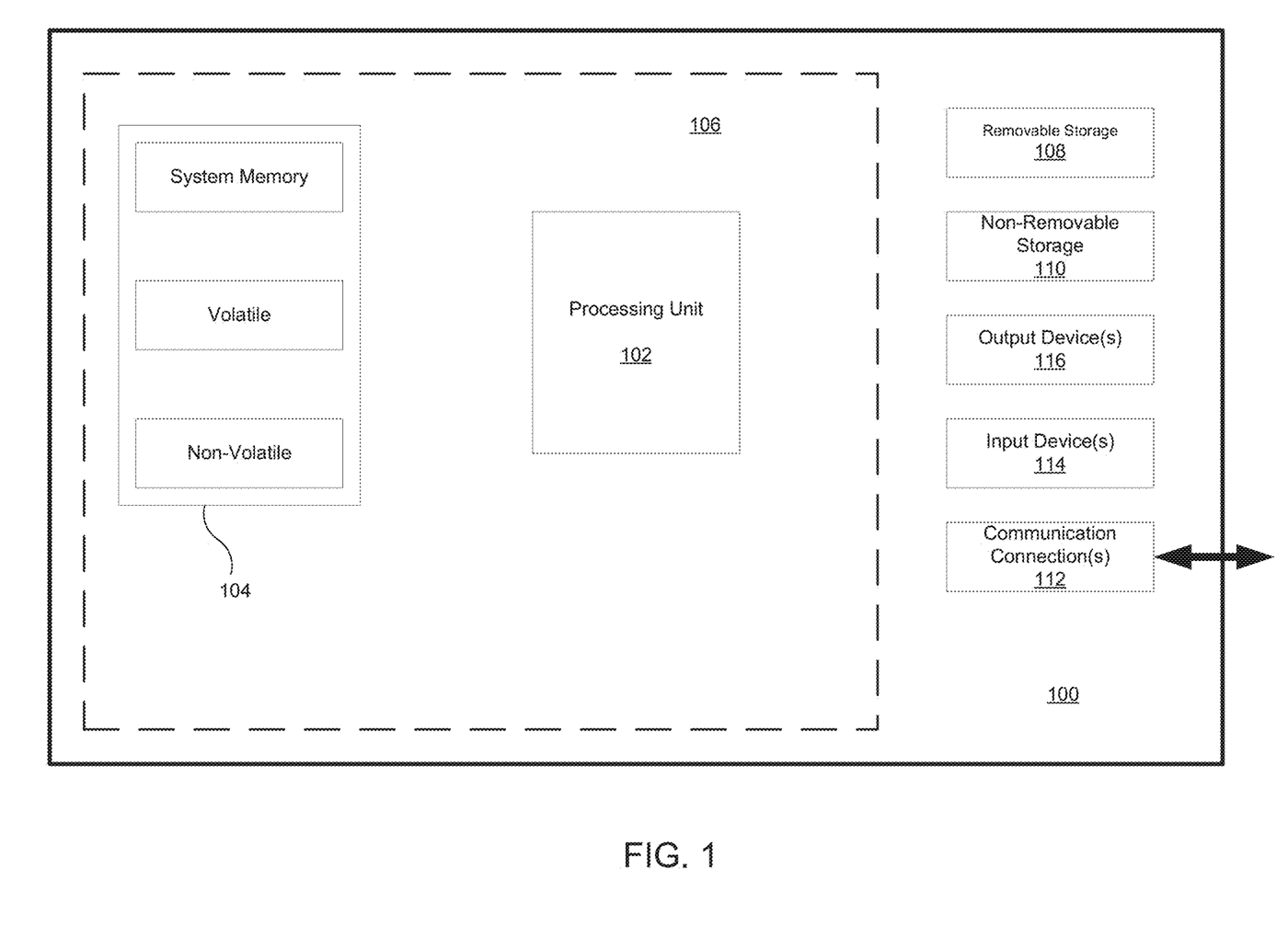
FIG. 1 is a schematic view of an exemplary operating environment in which an embodiment of the invention can be implemented.

FIG. 1 illustrates an example of a computing system environment 100 in which an embodiment of the invention may be implemented. The computing system environment 100, as illustrated, is an example of a suitable computing environment; however it is appreciated that other environments, systems, and devices may be used to implement various embodiments of the invention as described in more detail below.

Embodiments of the invention are operational with numerous general-purpose or special purpose computing system environments or configurations. Examples of well-known computing systems, environments, and/or configurations that may be suitable for use with embodiments of the invention include, but are not limited to, personal computers, server computers, hand-held or laptop devices, multi-processor systems, microprocessor-based systems, set-top boxes, programmable consumer electronics, network PCs, minicomputers, mainframe computers, distributed computing environments that include any of the above systems or devices, and the like.

Embodiments of the invention may be described in the general context of computer-executable instructions, such as program modules being executed by a computer. Generally, program modules include routines, programs, objects, components, data structures, etc. that perform particular tasks or implement particular abstract data types. Embodiments of the invention may also be practiced in distributed-computing environments where tasks are performed by remote processing devices that are linked through a communications network. In a distributed computing environment, program modules may be located in both local and remote computer storage media including memory storage devices. Additionally, the entity that may implement, or otherwise provide the ability to implement, elements of embodiments of the invention may be referred to herein as an "administrator."

With reference to FIG. 1, an exemplary system for implementing an embodiment of the invention includes a computing device, such as computing device 100. The computing device 100 typically includes at least one processing unit 102 and memory 104.

Depending on the exact configuration and type of computing device, memory 104 may be volatile (such as random-access memory (RAM)), nonvolatile (such as read-only memory (ROM), flash memory, etc.) or some combination of the two. This most basic configuration is illustrated in FIG. 1 by dashed line 106.

Additionally, the device 100 may have additional features, aspects, and functionality. For example, the device 100 may include additional storage (removable and/or non-removable) which may take the form of, but is not limited to, magnetic or optical disks or tapes. Such additional storage is illustrated in FIG. 1 by removable storage 108 and non-removable storage 110. Computer storage media includes volatile and nonvolatile, removable and non-removable media implemented in any method or technology for storage of information such as computer-readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

The device 100 may also include a communications connection 112 that allows the device to communicate with other devices. The communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, the communication media includes wired media such as a wired network or direct-wired connection, and wireless media such as acoustic, radio-frequency (RF), infrared and other wireless media. The term computer-readable media as used herein includes both storage media and communication media.

The device 100 may also have an input device 114 such as keyboard, mouse, pen, voice-input device, touch-input device, etc. Further, an output device 116 such as a display, speakers, printer, etc. may also be included. Additional input devices 114 and output devices 116 may be included depending on a desired functionality of the device 100.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

Figure 2:
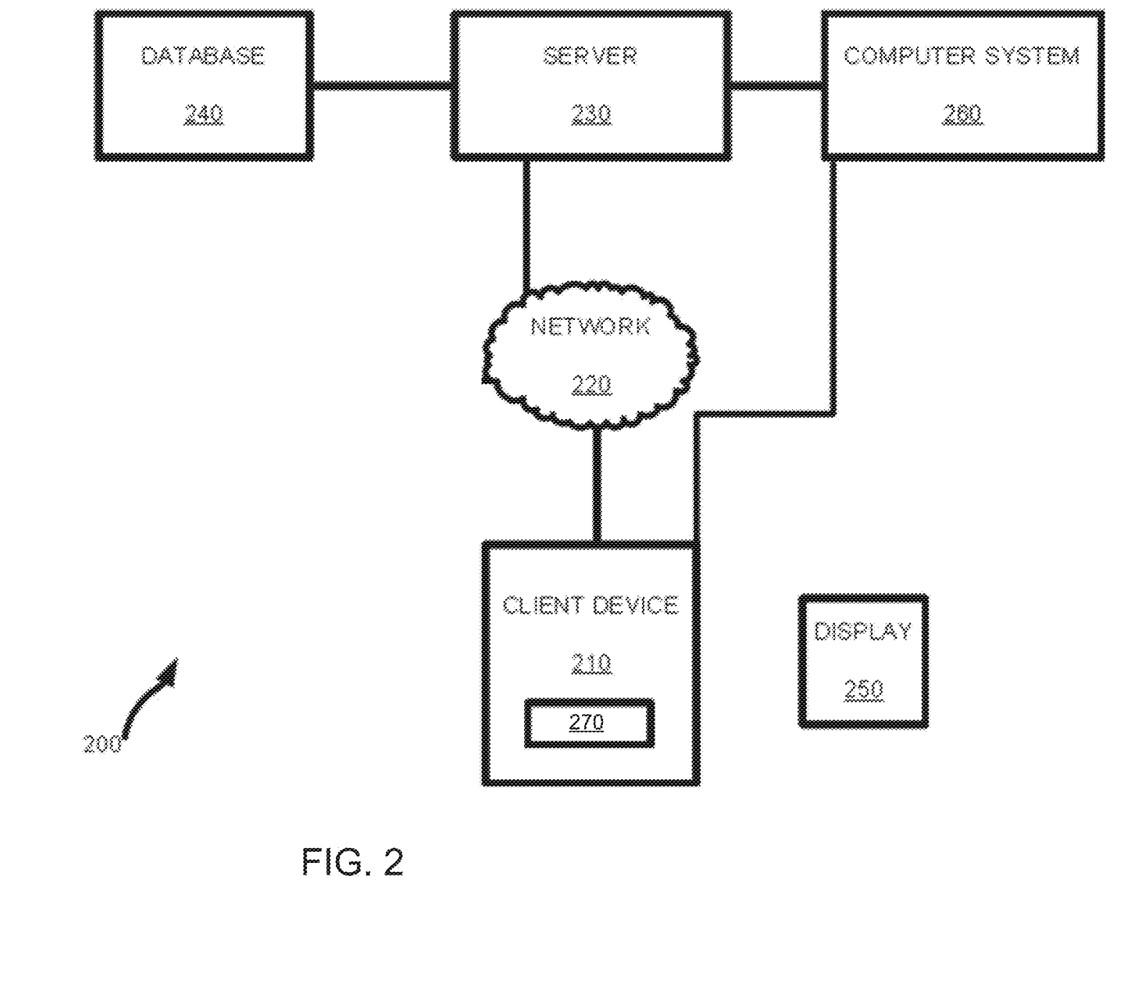
FIG. 2 is a functional block diagram of an exemplary operating environment in which an embodiment of the invention can be implemented.

Referring now to FIG. 2, an embodiment of the present invention may take the form, and/or may be implemented using one or more elements, of an exemplary computer network system 200. The system 200 includes an electronic client device 210, such as a personal computer or workstation, tablet or smart phone, that is linked via a communication medium, such as a network 220 (e.g., the Internet), to an electronic device or system, such as a server 230. The server 230 may further be coupled, or otherwise have access, to a database 240 and a computer system 260. Although the embodiment illustrated in FIG. 2 includes one server 230 coupled to one client device 210 via the network 220, it should be recognized that embodiments of the invention may be implemented using one or more such client devices coupled to one or more such servers.

The client device 210 and the server 230 may include all or fewer than all of the features associated with the device 100 illustrated in and discussed with reference to FIG. 1. The client device 210 includes or is otherwise coupled to a computer screen or display 250. The client device 210 may be used for various purposes such as network- and local-computing processes.

The client device 210 is linked via the network 220 to server 230 so that computer programs, such as, for example, a browser, running on the client device 210 can cooperate in two-way communication with server 230. The server 230 may be coupled to database 240 to retrieve information therefrom and to store information thereto. Database 240 may have stored therein data (not shown) that can be used by the server 230 and/or client device 210 to enable performance of various aspects of embodiments of the invention. The data stored in database 240 may include, for example, satellite and other aerial map data, including geographic information system (GIS)-layer data, automated vehicle locating (AVL) data and keyhole markup language (KML) data. Additionally, the server 230 may be coupled to the computer system 260 in a manner allowing the server to delegate certain processing functions to the computer system. In an embodiment, most or all of the functionality described herein may be implemented in a desktop application 270 that may include one or more executable modules. In an embodiment, the client device 210 may bypass network 220 and communicate directly with computer system 260.

Still referring to FIG. 2, and in operation according to an embodiment of the invention, a user (not shown) of the client device 210 desiring to track or review the performance of one or more emergency-response vehicles may invoke the desktop application 270. Alternatively, the user may invoke a browser running on the client device 210 to access web content, which may, but need not, be served by the server 230. Specifically, by employing an appropriate uniform resource locator (URL) in a known manner, the user may navigate to a website hosted by the server 230.

Figure 3:
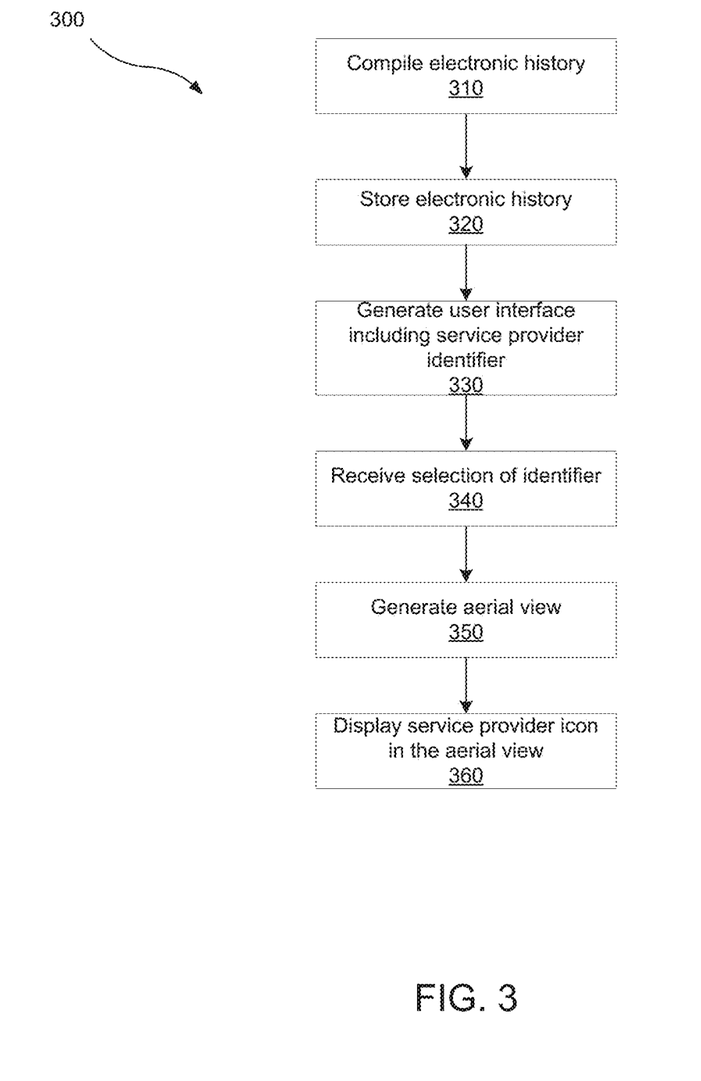
FIGS. 3-5 illustrates processes according to one or more embodiments of the invention.

FIG. 3 illustrates a process 300, according to an embodiment of the invention, for tracking a set of at least one emergency service provider. The process 300 is illustrated as a set of operations shown as discrete blocks. One or more steps of the process 300 may be implemented in any suitable hardware, software, including instructions embodied within components, firmware, or combination thereof. The order in which the operations associated with the process 300 are described is not to be necessarily construed as a limitation.

At a block 310, an electronic history is compiled. The electronic history includes at least one identifier of a service provider and GPS data identifying the geographic location of each service provider at each time interval within a time period. For example, the client device 210, server 230 and/or computer system 260 may regularly (e.g., every five seconds or other predetermined time interval) receive, via network 220 or other conventional means, AVL data from transmitters in a set of emergency response vehicles and correlate this data with respective identifiers of these response vehicles that are stored in database 240 and/or a memory device associated with client device 210. Such data will typically take the form of a latitude/longitude position of the response vehicle and the time at which such vehicle is in such position. Consequently, the electronic history that this correlative activity yields is configured to enable a processing device to determine the geographic location of a given response vehicle at, for example, five-second intervals within a time period of interest.

At a block 320, the electronic history is stored in a memory device. For example, once the position data has been correlated with the service provider identifiers to yield the electronic history, such history is stored in the database 240, for example.

Figure 6:
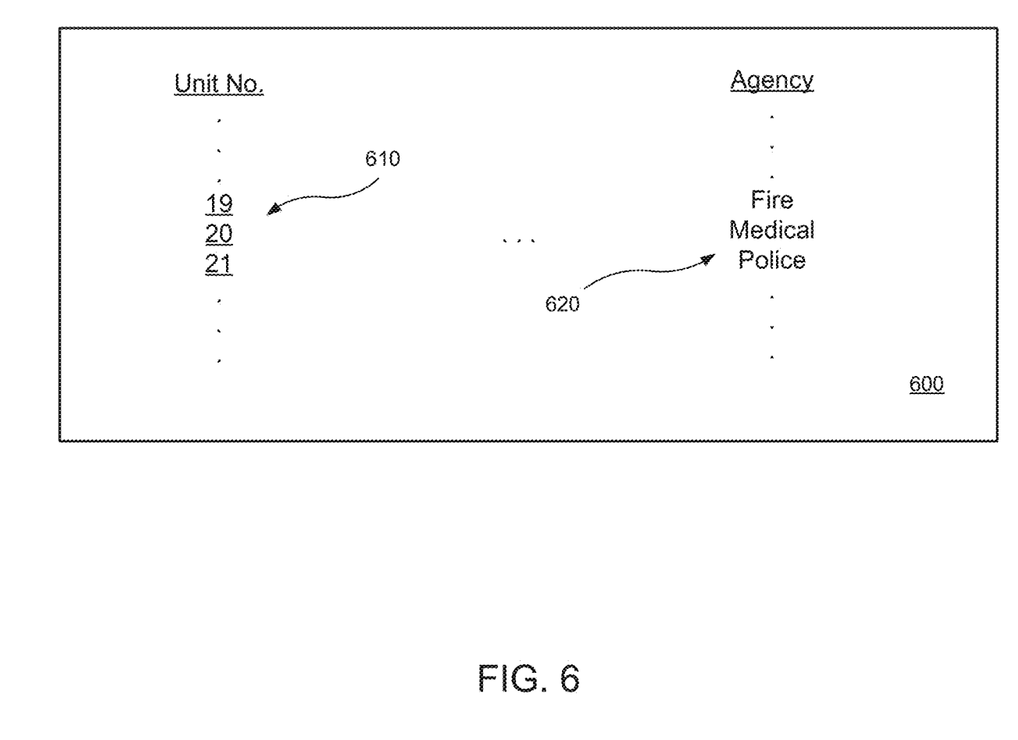
FIGS. 6-10 are screenshots illustrating functionality of one or more embodiments of the invention.

At a block 330, a user interface is generated to a display device within which is displayed a first identifier of a first service provider of the set of at least one service provider. For example, and referring to FIG. 6, the client device 210 may generate to the display 250 a menu 600 populated with user-selectable identifiers 610 of each response vehicle for which viewable tracking is available. For each identifier 610, the menu 600 may further identify the agency type 620 of the associated vehicle. Alternatively, the user interface may include a data entry field into which the user may enter, in a conventional manner, an identifier of a response vehicle for which viewable tracking is available.

At a block 340, a selection of the first service-provider identifier is received from a user via the user interface. For example, and again referring to FIG. 6, using a conventional pointer device (not shown), the user may select an identifier 610 of a response vehicle that the user wishes to track. Additionally, the user may select from the user interface a particular time period of interest (e.g., one or more days, one or more hours during a particular day, etc.), the activity of the selected response vehicle during which the user is interested in seeing. In an embodiment, this user selection of vehicle identifier and time period of interest may be transmitted to the server 230.

At a block 350, in response to the selection of the first service-provider identifier, an aerial view of a geographic region within which the first service provider was located during the time period is generated to a display device. For example, upon receiving a selection of identifier 610 and, consequently, a selection of a response vehicle of interest, the client device 210 may access the database 240, or other memory device, in which the electronic history is stored. From the electronic history, the client device 210 can determine the geographic region(s) in which the selected response vehicle was located during the selected time period of interest. Subsequently, the client device 210 can, in a conventional manner, generate to display 250 a rendering of the determined geographic region(s) using aerial map data, for example, that may be stored in database 240 or on the client device itself.

At a block 360, at least one icon representing the first service provider at the geographic location corresponding to at least one time interval of the set of time intervals is displayed in the aerial view. For example, in the aerial view 700 illustrated in FIG. 7, depending on the duration of the user-selected time period of interest, one or more icons 710 illustrating the activity of the selected response vehicle are superimposed on the rendered geographic region 720 determined at block 350. In the illustrated example, a comparatively lengthy time period of interest has been selected by the user, as evidenced by the large number of icons 710 depicting a police unit's comprehensive patrol over virtually the entirety of a large island part of the region 720. Of course, in at least one embodiment, icons illustrating the movement of more than one such response vehicle may be simultaneously displayed in similar fashion in the aerial view 700.

Figure 7:
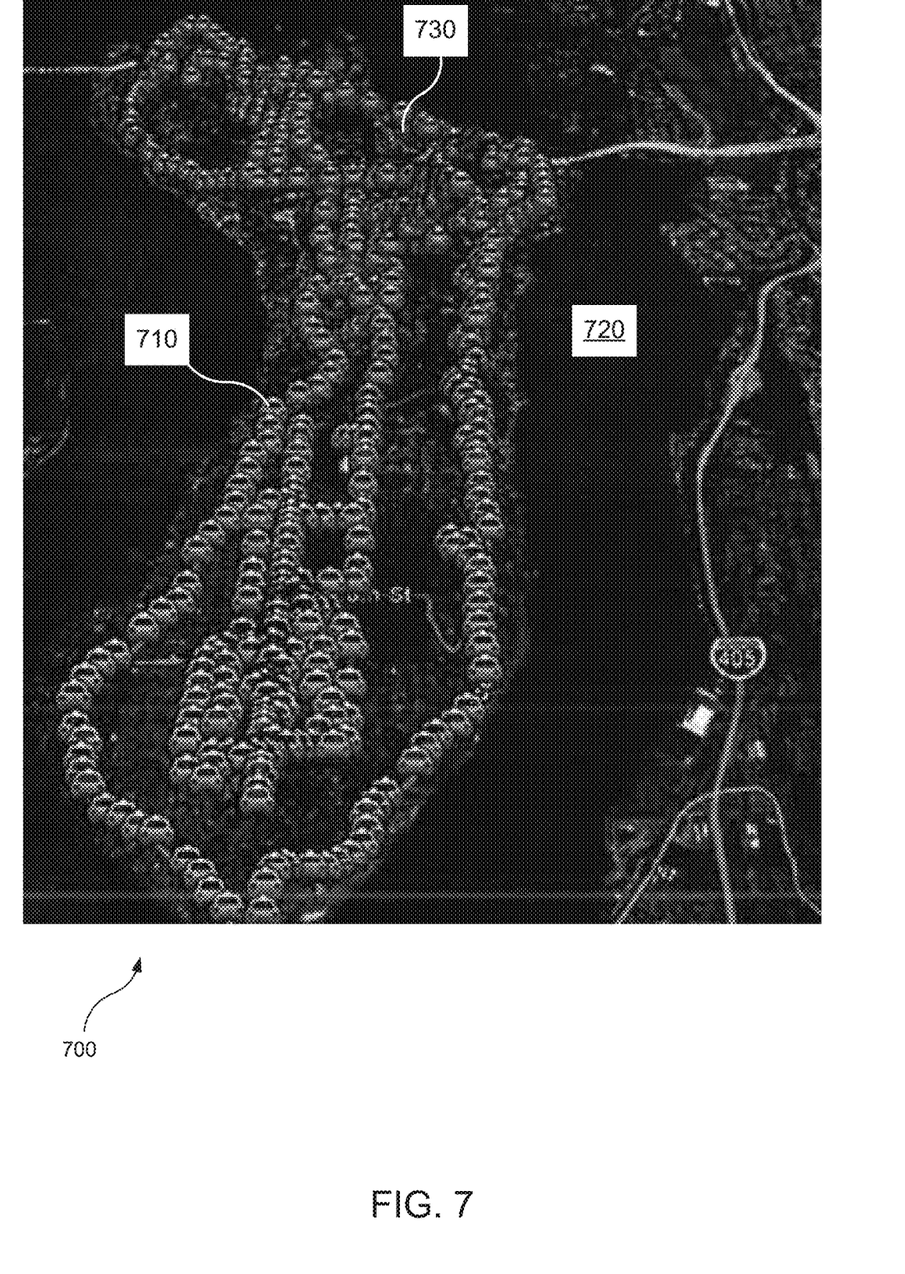

In an embodiment, in response to user selection of an icon 710, the velocity and bearing of the vehicle at the time associated with the selected icon is displayed in the aerial view 700. Additionally, the electronic history may further comprise identifiers of dispatch calls received by one or more of the emergency response vehicles. Consequently, an icon 730 may be displayed in the aerial view 700 illustrating a geographic location of the response vehicle at a time that the response vehicle received a dispatch call.

Figure 4:
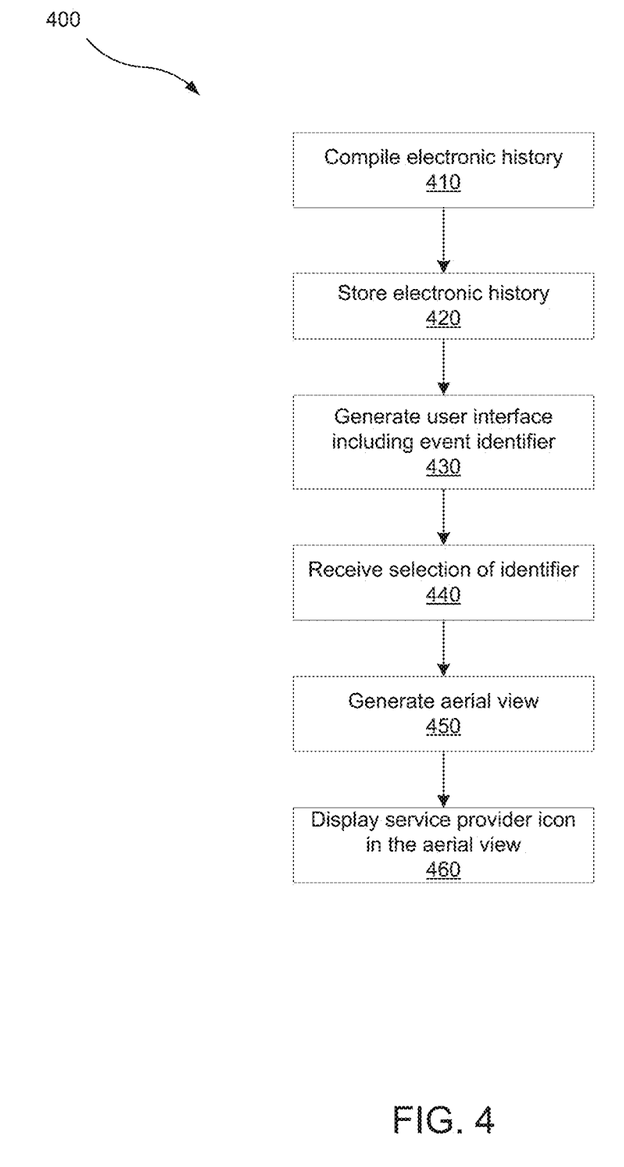

FIG. 4 illustrates a process 400, according to an embodiment of the invention, for tracking a set of at least one emergency service provider. The process 400 is illustrated as a set of operations shown as discrete blocks. One or more steps of the process 400 may be implemented in any suitable hardware, software, including instructions embodied within components, firmware, or combination thereof. The order in which the operations associated with the process 400 are described is not to be necessarily construed as a limitation.

At a block 410, an electronic history is compiled. The electronic history includes at least one identifier of a service provider, at least one identifier of an event to which the service provider responded, and GPS data identifying the geographic location of each service provider at each time interval within the duration of the event. The event is of a finite duration. For example, the client device 210, server 230 and/or computer system 260 may regularly (e.g., every five seconds or other predetermined time interval) receive, via network 220 or other conventional means, AVL data from transmitters in a set of emergency response vehicles and correlate this data with respective identifiers of these response vehicles and identifiers of and information associated with emergency-response events to which such vehicles responded. The identifiers of these response vehicles and identifiers of and information associated with emergency-response events may be stored in database 240 and/or a memory device associated with client device 210. The AVL data will typically take the form of a latitude/longitude position of the response vehicle and the time at which such vehicle is in such position. Consequently, the electronic history that this correlative activity yields is configured to enable a processing device to determine the geographic location of a given response vehicle at, for example, five-second intervals within the duration of an event. Additionally, the information stored in database 240 and/or client device 210 may further enable the inclusion in the electronic history of data identifying the geographic location of a given response vehicle at time intervals occurring prior and/or subsequent to the duration of the event. This latter feature may be implemented by, for example, employing the process 300 described above.

At a block 420, the electronic history is stored in a memory device. For example, once the position and event data has been correlated with the service provider identifiers to yield the electronic history, such history is stored in the database 240, for example.

Figure 8:
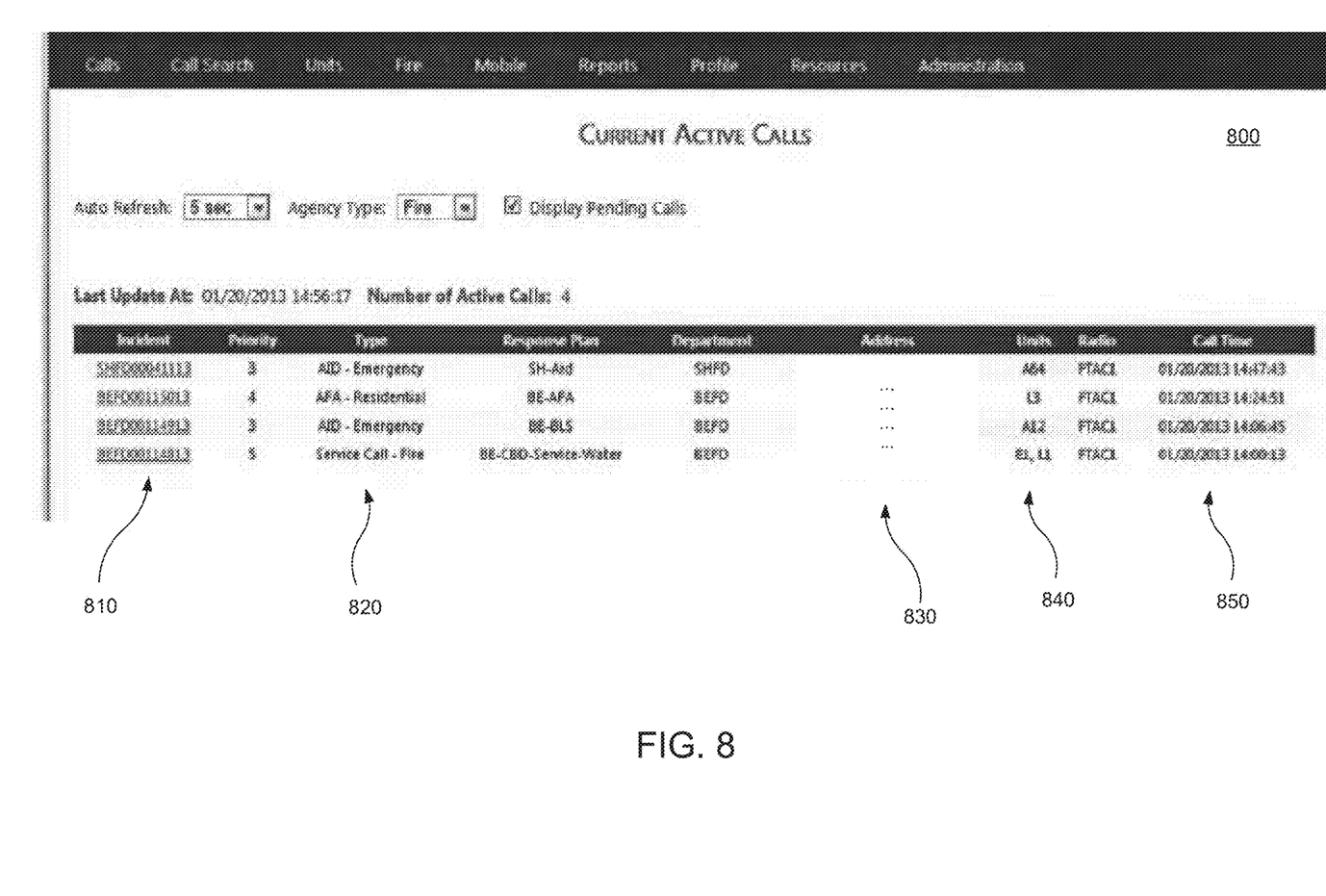

At a block 430, a user interface is generated to a display device within which is displayed a first identifier of a first event of the set of at least one event. For example, and referring to FIG. 8, the client device 210 may generate to the display 250 a menu 800 populated with user-selectable identifiers 810 of events to which response vehicles, for which viewable tracking is available, responded. For each identifier 810, the menu 800 may further display a description 820 of the event, the address 830 of the event, identifiers 840 of the response vehicles responding to the event and identifiers 850 of the date/time of the event.

At a block 440, a selection of the first event identifier is received from a user via the user interface. For example, and again referring to FIG. 8, using a conventional pointer device (not shown), the user may select an identifier 810 of an event to which response vehicles, for which viewable tracking is available, responded.

At a block 450, in response to the selection of the first event identifier, an aerial view of a geographic region within which the first event took place is generated to a display device. For example, upon receiving a selection of identifier 810 and, consequently, a selection of an event of interest, the client device 210 may access the database 240, or other memory device, in which the electronic history is stored. From the electronic history, the client device 210 can determine the geographic region in which the selected event took place. Subsequently, the client device 210 can, in a conventional manner, generate to display 250 a rendering of the determined geographic region using aerial map data, for example, that may be stored in database 240 or on the client device itself.

Figure 9:
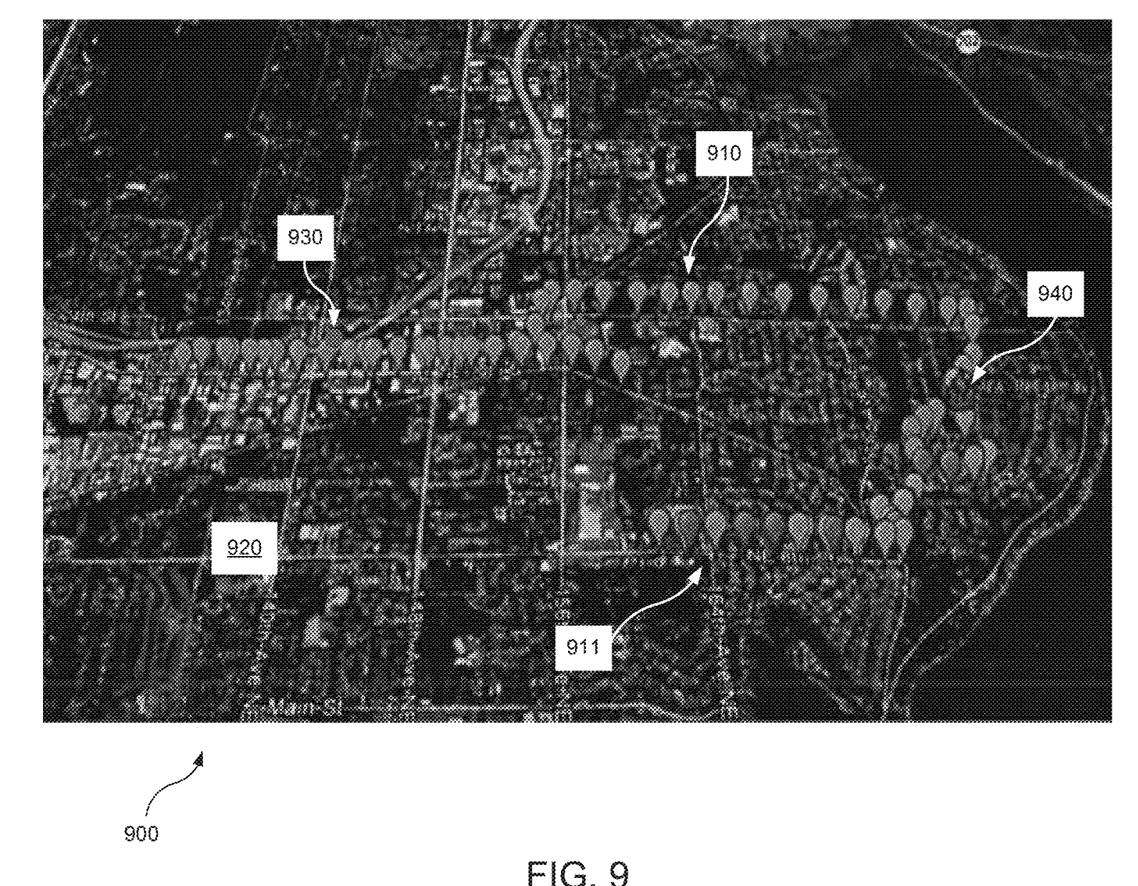

At a block 460, at least one icon representing at least one responding service provider at the geographic location corresponding to at least one time interval within the duration of the event is displayed in the aerial view. For example, as illustrated in FIG. 9, two response vehicles responded to the event selected from menu 800. Consequently, depending on the number of time intervals selected by the user for viewing, two sets of one or more icons 910, 911 illustrating the respective activity of the two response vehicles in transit to and arriving at the scene of the event are superimposed on the rendered geographic region 920 determined at block 450.

In an embodiment, in response to user selection of an icon 910, 911, the velocity and bearing of the vehicle at the time associated with the selected icon is displayed in the aerial view 900. Additionally, the electronic history may further comprise identifiers of dispatch calls received by one or more of the emergency response vehicles, as well as identifiers of one or more event locations to which such response vehicles travel in response to a dispatch call. Consequently, a call icon 930 may be displayed in the aerial view 900 illustrating a geographic location of one or more of the response vehicles at a time that such response vehicle received a dispatch call. Similarly, an event icon 940 may be displayed in the aerial view 900 illustrating the event location(s) to which such response vehicles traveled in response to a dispatch call. In an embodiment, a selection of the event icon 940 by the user may cause information about the event, such as the address of the event, time of event, the type of event, etc. to be displayed in the aerial view 900.

Figure 5:
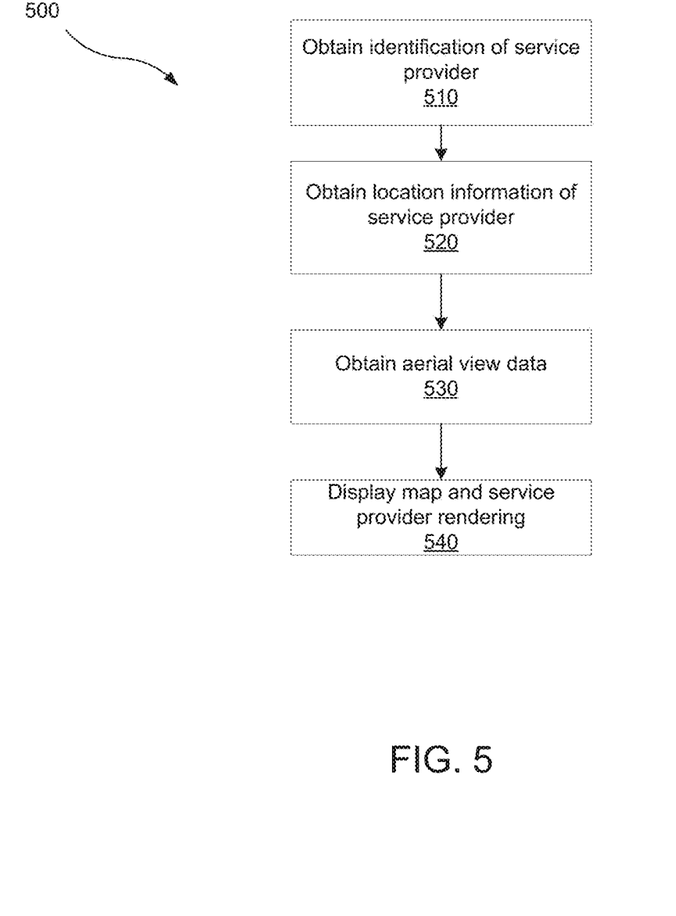

FIG. 5 illustrates a process 500, according to an embodiment of the invention. The process 500 is illustrated as a set of operations shown as discrete blocks. One or more steps of the process 500 may be implemented in any suitable hardware, software, including instructions embodied within components, firmware, or combination thereof. The order in which the operations associated with the process 500 are described is not to be necessarily construed as a limitation.

At a block 510, identification information for at least one service provider is obtained. For example, identifiers of emergency response vehicles, identical or similar to those discussed above with reference to process 300, for example, may be stored in, and accessible by server 230 and/or client device 210 from, database 240 and/or a memory device associated with the client device.

At a block 520, location information for the at least one service provider is obtained. For example, the client device 210, server 230 and/or computer system 260 may regularly (e.g., every five seconds or other predetermined time interval) receive, via network 220 or other conventional means, AVL data from transmitters in a set of emergency response vehicles and correlate this data with respective identifiers of these response vehicles that are stored in database 240 and/or client device 210. Such data will typically take the form of a latitude/longitude position of the response vehicle and the time at which such vehicle is in such position.

At a block 530, data is obtained enabling the generation to a display device of an aerial view of a geographic region in which the location information indicates the at least one service provider has been in transit. For example, the client device 210 can determine, based on the identification information and/or location information, the geographic region(s) in which a selected response vehicle was located during a given time period or, for example, a user-selected time period of interest. Subsequently, the client device 210 can, in a conventional manner, generate to display 250 a rendering of the determined geographic region(s) using aerial map data, for example, that may be stored in database 240 or on the client device itself.

Figure 10:
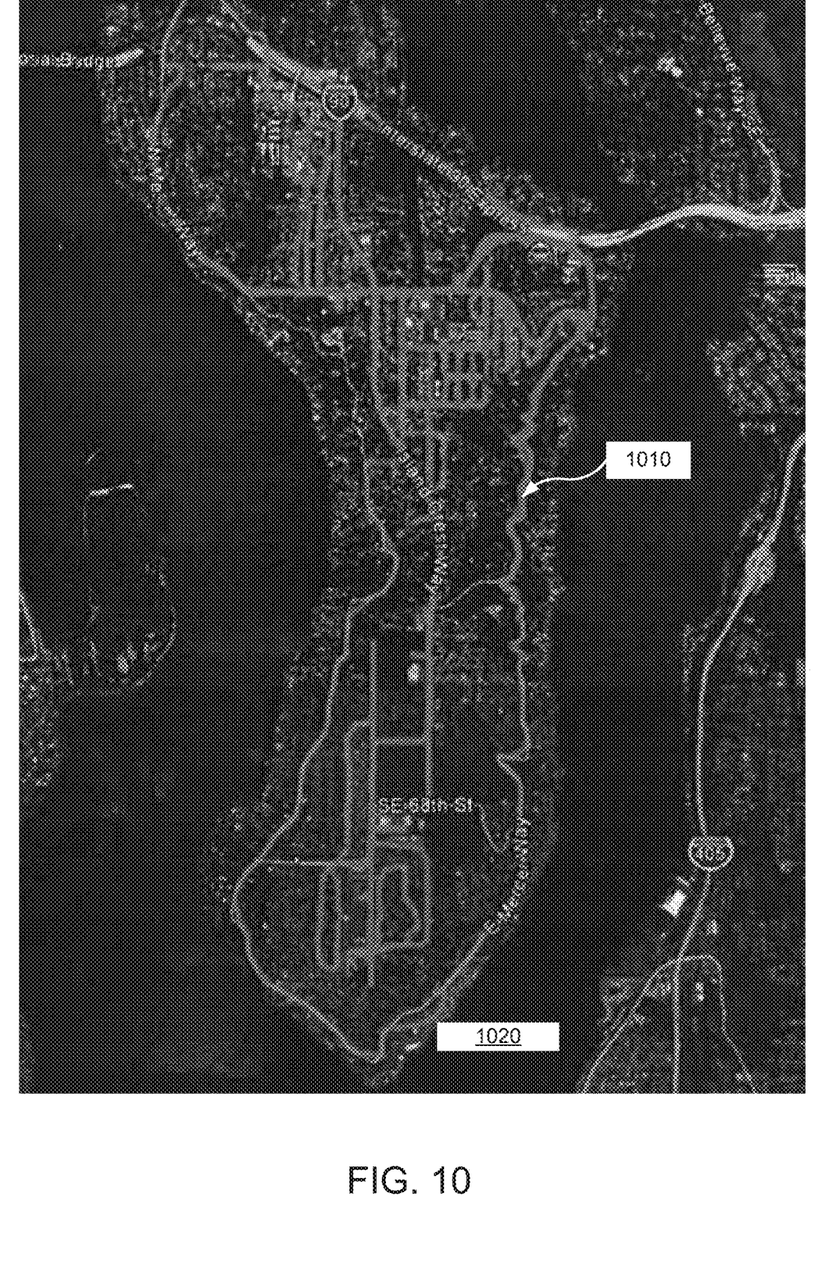

At a block 540, the map information is displayed overlaid with an animated rendering of the movement of the at least one service provider within the geographic region. For example, as illustrated in FIG. 10, the activity of a selected response vehicle is superimposed as a "slug trail" 1010 on the rendered geographic region 1020 determined at block 530. In an embodiment, the brighter and thicker the slug trail, the more frequently the unit drove along that particular stretch of road.

While the preferred embodiment of the invention has been illustrated and described, as noted above, many changes can be made without departing from the spirit and scope of the invention. For example, at least one embodiment described above herein may be implemented in connection with Fire and EMS units, in addition to the Police units discussed in the illustrated examples. Additionally, at least one embodiment described above herein may be implemented with respect to non-emergency service providers, such as mail and package delivery, grocery delivery, and large scale transportation operations such as shipping and airlines. An embodiment may include GIS layers, for example, that enable the placement in the aerial view 700, 900 of police and fire station locations, as well as fire response areas and police beats. In an embodiment, icons representing the station locations, response areas and or beats may be selected by user, in response to which icons representing movement of all units associated with such locations/areas/beats may be automatically shown in the aerial view 700, 900. Additionally, clicking on any of the icons representing a response unit may open up a window, for example, indicating the unit's call sign, their location, and the timestamp of that particular AVL plot. Additionally, an embodiment may include animation controls associated with the aerial view 700, 900 enabling a user to control the speed at which the icons representing response vehicles are sequentially placed in the aerial view to illustrate the movement of the corresponding unit. These controls also enable the user to control the length of the icon "vector" (i.e., the number of icons shown at any given time to illustrate movement of the corresponding vehicle) during the animation within the aerial view 700, 900. Moreover, the electronic histories described above may be processed in such a manner as to allow the user to view movement of a vehicle in "near real-time" in the aerial view 700, 900. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A computer-implementable method of tracking a set of at least one mobile emergency service provider, the method comprising the steps of:
   compiling an electronic history comprising: (a) at least one identifier of a service provider of said set of at least one service provider and (b) GPS data identifying the geographic location of each said service provider at each time interval of a set of time intervals of predetermined length within a time period;
   wherein the electronic history further comprises identifiers of a set of at least one dispatch call received by at least one service provider of the set of at least one service provider;
   storing said electronic history in a memory device;
   generating to a display device a user interface within which is displayed a first identifier of a first service provider of the set of at least one service provider;
   receiving from a user, via the user interface, a selection of the first service-provider identifier;
   in response to the selection of the first service-provider identifier, generating to a display device an aerial view of a geographic region within which the first service provider was located during the time period; and
   displaying in the aerial view at least one icon representing the first service provider at the geographic location corresponding to at least one time interval of the set of time intervals,
   wherein displaying in the aerial view further comprises displaying an icon illustrating a geographic location of the first service provider at a time that the first service provider received the at least on dispatch call;
   wherein the preceding steps are performed by at least one processor.

2. The method of claim 1, wherein the set of at least one service provider comprises a police unit.

3. The method of claim 1, further comprising:
   receiving from the user, via the user interface, a selection of the at least one icon; and
   displaying, in response to said user selection of the at least one icon, the velocity and bearing of the first service provider.

4. The method of claim 1, further comprising:
   generating within the user interface a second identifier of a second service provider of the set of at least one service provider;
   receiving from the user, via the user interface, a selection of the second service-provider identifier;
   in response to the selection of the second service-provider identifier, generating to a display device an aerial view of a geographic region within which the second service provider was located during the time period; and
   simultaneously displaying in the aerial view icons representing the first and second service providers at the geographic location corresponding to at least one time interval of the set of time intervals.

5. A computer-implementable method of tracking a set of at least one mobile emergency service provider, the method comprising the steps of:
   compiling an electronic history comprising (a) at least one identifier of a service provider of the set of at least one service provider, (b) at least one identifier of an event of a set of at least one event to which at least one of the service providers responded, each event of the set being of a finite duration, and (c) GPS data identifying the geographic location of each said service provider at each time interval of a set of time intervals of predetermined length within the duration of said at least one event;
   wherein the electronic history further comprises identifiers of a set of at least one dispatch call received by at least one service provider of the set of at least one service provider;
   storing the electronic history in a memory device;
   generating to a display device a user interface within which is displayed a first identifier of a first event of said set of at least one event;
   receiving from a user, via the user interface, a selection of the first event identifier;
   in response to the selection of the first event identifier, generating to a display device an aerial view of a geographic region within which the first event took place; and
   displaying in the aerial view at least one icon representing at least one of said service providers at the geographic location corresponding to at least one time interval of said set of time intervals within the duration,
   wherein the step of displaying in the aerial view further comprises displaying an icon illustrating a geographic location of said at least one first service provider at a time that said at least one service provider received the at least one dispatch call;
   wherein the preceding steps are performed by at least one processor.

6. The method of claim 5, wherein:
   the electronic history further comprises GPS data identifying the geographic location of each said service provider at each time interval of a set of time intervals of predetermined length occurring prior to said at least one event; and
   further comprising displaying in the aerial view at least one icon representing at least one of said service providers at the geographic location corresponding to at least one time interval of said set of time intervals occurring prior to said at least one event.

7. The method of claim 5, wherein:
   the electronic history further comprises GPS data identifying the geographic location of each said service provider at each time interval of a set of time intervals of predetermined length occurring subsequent to said at least one event; and
   further comprising displaying in the aerial view at least one icon representing at least one of said service providers at the geographic location corresponding to at least one time interval of said set of time intervals occurring subsequent to said at least one event.

8. The method of claim 5, wherein the set of at least one service provider comprises a police unit.

9. The method of claim 5, further comprising:
   receiving from the user, via the user interface, a selection of the at least one icon; and
   displaying, in response to said user selection of the at least one icon, the velocity and bearing of the at least one said service provider.

10. The method of claim 5, further comprising:
    generating within the user interface a second identifier of a second event of said set of at least one event;
    receiving from the user, via the user interface, a selection of the second event identifier;
    in response to the selection of the second event identifier, generating to a display device an aerial view of a geographic region within which the second event took place; and simultaneously displaying in the aerial view icons placed in the respective locations of the first and second events.

11. A computer-implementable method of tracking mobile emergency service providers, the method comprising the steps of:
  obtaining identification information for at least one emergency service provider;
  obtaining location information identifying the location of the at least one service provider at each time interval of a set of time intervals of predetermined length within a time period;
  obtaining data enabling the generation to a display device of an aerial view of a geographic region in which the location information indicates the at least one service provider has been in transit; and
  displaying the map information overlaid with an animated rendering of the movement of the at least one service provider within the geographic region,
  wherein the aerial view further comprises an icon illustrating a geographic location of the service provider at a time that the service provider received a dispatch call;
  wherein the preceding steps are performed by at least one processor.

12. The method of claim 11, wherein the at least one service provider comprises a police unit.

* * * * *